United States Patent [19]

Porret et al.

[11] 3,925,406

[45] Dec. 9, 1975

[54] DIALKOXYPHOSPHONOMETHYL DERIVATIVES OF HYDANTOINS

[75] Inventors: Daniel Porret, Fresens, NE; Jürgen Habermeier, Pfeffingen, both of Switzerland

[73] Assignee: Ciba-Geigy Corporation, Ardsley, N.Y.

[22] Filed: Feb. 7, 1975

[21] Appl. No.: 548,050

Related U.S. Application Data

[63] Continuation-in-part of Ser. No. 347,527, April 3, 1973, abandoned.

[30] Foreign Application Priority Data

Apr. 4, 1972  Switzerland.......................... 4893/72

[52] U.S. Cl...... 260/309.5; 260/30.6 R; 260/45.7 P; 260/45.8 N

[51] Int. Cl.²...................................... C07D 233/72

[58] Field of Search............................... 260/309.5

[56] References Cited

UNITED STATES PATENTS 2,928,841   3/1960   McConnell et al. ............. 260/309.5

*Primary Examiner*—Natalie Trousof
*Attorney, Agent, or Firm*—Luther A. R. Hall

[57] ABSTRACT

Dialkoxyphosphonomethyl-hydantoin derivates, which can be used for rendering plastics and fibres noninflammable, are described along with their methods of preparation and use.

7 Claims, No Drawings

DIALKOXYPHOSPHONOMETHYL DERIVATIVES OF HYDANTOINS

This application is a continuation-in-part of copending application, Ser. No. 347,527, filed Apr. 3, 1973, now abandoned. The invention relates to dialkoxyphosphonomethyl-hydantoins and dialkoxyphosphonomethyl-dihydrouracils, processes for their manufacture and their use for rendering plastics and fibres non-inflammable.

Flameproofing agents containing phosphorus are already known. In order to achieve a favourable effect, considerable amounts of these agents, in most cases mor than 10%, must be added to the plastics to be protected, but this frequently has unfavourable effects on the plastics to be protected in other, respects, for example mechanical respects. It has now been found that the phosphorus-containing compounds according to the invention render plastics non-inflammable if they are added in such amounts that the phosphorus content is at least 0.8 – 4%.

The compounds according to the invention correspond to the formula I or I'

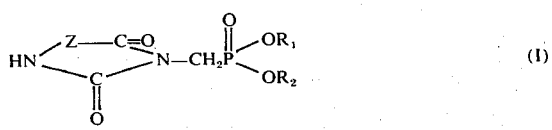

or

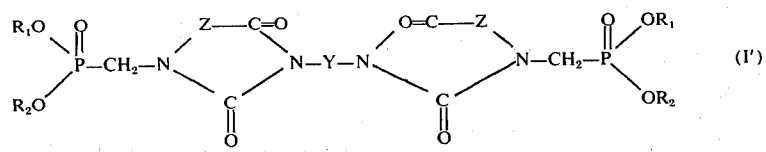

in which Z denotes a nitrogen-free divalent radical which is necessary to complete a five-membered or six-membered ring and Y denotes a divalent aliphatic, cycloaliphatic or araliphatic radical and $R_1$ as well as $R_2$ each represent an alkyl or alkenyl group which can be substituted, for example by halogen, or together represent an alkylene group with 2 to 5 carbon atoms.

Z preferably represents a methylene group which can be substituted by alkyl groups $R_3$ and $R_4$ with 1 to 6 carbon atoms or a cycloalkylidene group. Z can be especially the isopropylidene group, also the n- or isopropylmethylene group, the cyclohexylidene group or cyclopentylidene group or an ethylene group which is optionally substituted by alkyl groups with 1 to 4 carbon atoms, such as the ethylene, the 1,2-dimethylethylene, the 2,2-dimethylethylene or the 1-methyl-2-isopropylethylene group.

$R_1$ and $R_2$ preferably each denote an alkyl or alkenyl group with 1 to 4 carbon atoms, especially the methyl or ethyl group, but also the propyl, butyl, allyl, butenyl or monochloroethyl group.

Y preferably represents an alkylene group, such as the methylene, ethylene, butylene, hexylene or dodecylene group, or an alkylene group interrupted by heteroatoms, such as 3-oxapentamethylene.

A prime objective of this invention relates to the preparation of dialkoxyphosphonomethyl derivatives of hydantoin from the corresponding N-halogenomethyl derivatives of hydantoin as useful flame retardants for a variety of polymeric systems. The N-halogenomethyl derivatives are directly converted to the corresponding phosphonate esters using phosphite esters, such as triethyl phosphite, in the well-known Arbuzov reaction.

The phosphonate esters attached to hydantoin moieties are particularly useful as flame retardants possessing as they do both nitrogen and phosphorus. The particularly efficacious activity as flame retardants of certain molecules containing both nitrogen and phosphorus is well-known as described by J. W. Lyons, "The Chemistry and Uses of Fire Retardants", Wiley-Interscience, New York, 1970, pp. 20–21, 189, 354–357. Phosphonates are widely useful as flame retardants in many polymeric systems including cellulosics ibid, pp. 184–189, polyurethanes, pp. 354–357, and polyesters, pp. 373–374, 398–401. In the latter case the phosphonates are often incorporated into polyester melts where they self-polymerize and tranesterify with the polyester involved. The phosphonate ester derivatives of bis-hydantoins of this invention are useful as flame retardants in a variety of polymeric systems.

The compounds according to the invention are manufactured by reacting the compounds of the formula II or II'

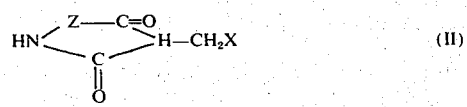

or

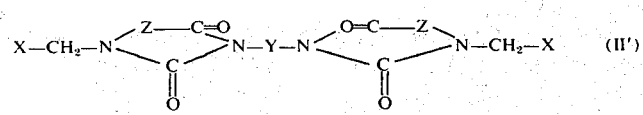

in which X denotes chlorine or bromine, with a trialkylphosphite of the formula III

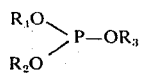

wherein R₃ denotes an optionally substituted alkyl or alkenyl group.

For the reaction, which corresponds to a Michaelis-Arbusov reaction, the mixture is usually warmed for several hours to above 100°C, preferably 120°–160°C, whereupon R₃X distills off. R₃X is, for example, ethyl chloride, ethyl chloride, butyl chloride or 1,2-dichloroethane.

The starting substances of the formula II or II' for the manufacture of the compounds according to the invention are obtained by reaction of the corresponding hydroxymethyl compounds with compounds which introduce chlorine or bromine, for example with acid halides, such as SOCL₂, SOBr₂, oxalyl chloride, PCl₃, PCl₅, PBr₃, POCl₃ or hydrogen chloride or hydrogen bromide.

The compounds according to the invention, of the formula I or I', can also be obtained by reaction of compounds of the formula IC or IV'

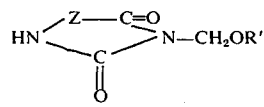

or

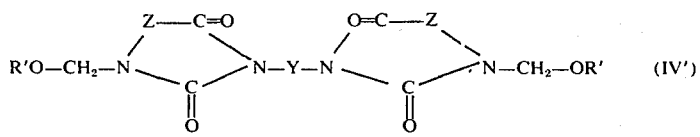

in which R' denotes a hydrogen atom, an alkyl group with 1 to 6 carbon atoms, a hydroxyalkyl group with 1 to 6 carbon atoms, an alkoxyalkyl group with 2 to 10 carbon atoms or an aryl group, with phosphorous acid dialkyl esters of the formula V $$\begin{array}{c} R_1O \\ \phantom{R}\diagdown \phantom{O} \\ \phantom{RR}P-H \\ \phantom{R}\diagup \phantom{O} \\ R_2O \end{array} \quad (V)$$

R' preferably represents hydrogen, or the methyl, ethyl, hydroxyethyl, ethoxyethyl or phenyl group.

The reaction is appropriately carried out at elevated temperature, for example from 40° to 100°C, optionally with the addition of an acid or basic catalyst, such as hydrogen chloride or triethylamine, and in the presence of solvents or diluents, such as alcohols or dioxane.

The products according to the invention are liquid to crystalline substances which are colourless in the pure state. They can be purified by recrystallisation or vacuum distillation.

On incorporation into polymers or their starting substances, thex impart non-inflammability thereto. Where they still contain an active hydrogen atom (compounds of the formula I) they are capable of glycidylation, ethylolation and other reactions, for example the formation of adducts with epoxide resins.

For example, they can be added to epoxide resin-curing agent mixtures before the curing reaction is carried out. They can also be incorporated into the polymeric material by kneading, for example by dissolving or suspending them in a solvent or dispersing agent, such as methanol, ethanol or acetone, mixing this solution or suspension with the powdered polymer and removing the solvent or suspending atent. The effective amount of the substance according to the invention depends on the material to be protected and on the structure of the phosphorus-containing compound. The minimum active amount is however surprisingly low: in general, a phosphorus content of 2 to 4% in the material already suffices in order to render this material non-inflammable.

EXAMPLE 1

3-Dimethoxy-phosphonomethyl-5,5-dimethylhydantoin

A mixture of 529 g of 3-chloromethyl-5,5-dimethylhydantoin (3,0 mols) and 447 g of trimethylphosphite (3,6 mols) is warmed to 150°C internal temperature (bath temperature 120°–160°C) over the course of 70 minutes, during which strong refluxing occurs. The methyl chloride produced in the reaction is condensed in a cold trap at −80°C in order to control the course of the reaction. After a period of a further 2 hours the elimination of methyl chloride is complete and 150 g of methyl chloride (99,7% of theory) are obtained. The reaction product is freed of readily volatile constituents, such as excess trimethylphosphite, at 90°C in a water pump vacuum and is subsequently dried to constant weight at 0.1 mm Hg and 90°C.

780 g of a yellowish, crystalline crude product are obtained and purified by recrystallisation from 500 ml of methyl ethyl ketone. 543.2 g of 3-(methanephosphonic acid dimethyl ester)-5,5-dimethylhydantoin [=(5,5-dimethylhydantoinyl-3)-methanephosphonic acid dimethyl ester or = 3-(dimethoxyphosphonomethyl)-5,5-dimethylhydantoin] (72% of theory) of melting point 112°–113.2°C are obtained.

| Elementary analysis: | found: | calculated: |
|---|---|---|
| | 38.4 % C | 38.41 % C |
| | 6.2 % H | 6.04 % H |
| | 11.3 % N | 11.2 % N |
| | 12.7 % P | 12.38 % P |

The H—NMR spectrum is reconcilable with the following structure:

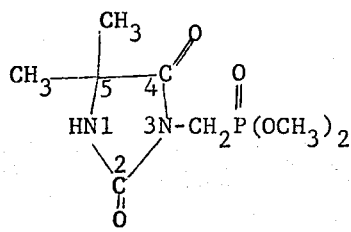

EXAMPLE 2

3-Diethoxyphosphonomethyl-5,5-dimethylhydantoin 176.6 of 3-chloromethyl-5,5-dimethylhydantoin (1.0 mol) are mixed with 199,5 of triethylphosphite (1.2 mols) and stirred for 5 hours at 126°–153°C internal temperature, in the course of which 60.0 g of ethyl chloride (93.0% of theory) are eliminated. The resulting reaction product is freed of readily volatile constituents analogously to Example 1 and 273.3 g of crude product (98.1% of theory) are obtained. Distillation of the crude product in a high vacuum yields 214.6 g of 3-(methanephosphonic acid diethyl ester)-5,5-dimethylhydantoin (=3-diethoxy-phosphonomethyl-5,5-dimethylhydantoin) (77.1% of theory) of boiling point 175°C/0.3 mm Hg and melting point 79°–82°C.

| Elementary analysis: | found: | calculated: |
|---|---|---|
| | 42.88 % C | 43.17 % C |
| | 7.10 % H | 6.88 % H |
| | 10.06 % N | 10.07 % N |
| | 11.09 % P | 11.13 % P |

The H—NMR spectrum is reconsilable with the following structure:

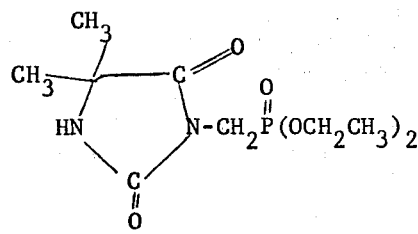

EXAMPLE 3

3-Diethoxyphosphonomethyl-5,5-pentamethylenehydatoin

Analogously to Example 1, 216 g of 3-chloromethyl-1,3-diazaspiro-[4,5]-decane-2,4-dione (1.0 mol) and 199.5 g of triethylphosphite (1.2 mols) are treated for 3 hours 40 minutes at 120° to 146°C internal temperature. Thereafter, 16.6 g of triethylphosphite (0.1 mol) are added and the mixture is left to react for a further 3 hours 20 minutes. After working up analogously to Example 1, 299 g of a brown, highly viscous crude product (93.9% of theory) are obtained. Crystallisation from toluene: cyclohexane, 1:5, and subsequent distillation of the crystals in a bulb tube at 152°–154°C/0.05 mm Hg yields 3-(methanephosphonic acid diethyl ester)-1,3-diazo-spiro[4.5]-decane-2,4-dione (=3-diethoxy-phosphonomethyl-5,5-pentamethylene-hydantoin) of melting point 102°–104°C.

| Elementary analysis: | found: | calculated: |
|---|---|---|
| | 49.29 % C | 49.05 % C |
| | 7.22 % H | 7.28 % H |
| | 8.73 % N | 8.80 % N |
| | 9.92 % P | 9.73 % P |

The H—NMR spectrum agrees with the following structure:

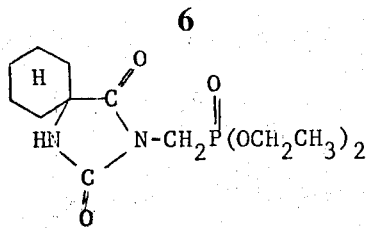

EXAMPLE 4

3-Di-n-butoxy-phosphonomethyl-5,5-dimethylhydantoin 68.6 g of 3-chloromethyl-5,5-dimethylhydantoin (0.388 mol) and 90.5 g of tri-n-butylphosphite (0.466 mol) are warmed to 115°C internal temperature and thereafter the heating is removed since an exothermic reaction takes place. The internal temperature rises over the course of 4 minutes to 144°C, whilst the butyl chloride eliminated is distilled off. Thereafter the mixture is kept at 144°–152°C internal temperature for a further 3 hours 50 minutes to complete the elimination of butyl chloride. [Butyl chloride eliminated = 33.9 g (89.2% of theory)]. The working up takes place analogously to Example 1, and 117.9 g of a clear, yellow, viscous crude product (90.8% of theory) are obtained.

A crude product distilled in a bulb tube at 150°C/0.4 mm Hg gave a colourless, viscous distillate having the following analytical data:

| Elementary analysis: | found: | calculated: |
|---|---|---|
| | 49.77 % C | 50.29 % C |
| | 8.02 % H | 8.14 % H |
| | 8.73 % N | 8.38 % N |
| | 9.00 % P | 9.26 % P |

The H—NMR spectrum is essentially reconcilable with the following structure:

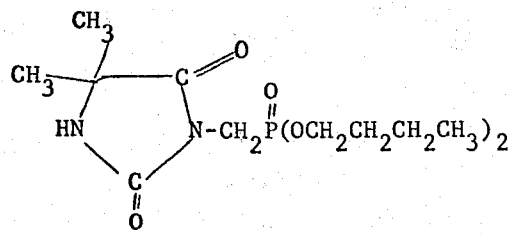

EXAMPLE 5

3,3'-Methylene bis(1-diethoxyphosphonomethyl-5,5-dimethylhydantoin)

Analogously to Example 1, 18.26 g of bis-(1-chloromethyl-5,5-dimethylhydantoinyl-3)-methane (0.05 mol) and 19.9 g of triethylphosphite (0.12 mol) are reacted for 4 hours and 30 minutes at an internal temperature of 110°–142°C. After working up according to Example 1, 28.1 g of a brownish, clear, highly viscous product (99,0% of theory) having the following analytical data are obtained:

| found: | calculated: |
|---|---|
| 44.47 % C | 44.37 % C |
| 7.02 % H | 6.74 % H |
| 9.67 % N | 9.86 % N |
| 10.79 % P | 10.90 % P |

The analysis agrees with the following structure:

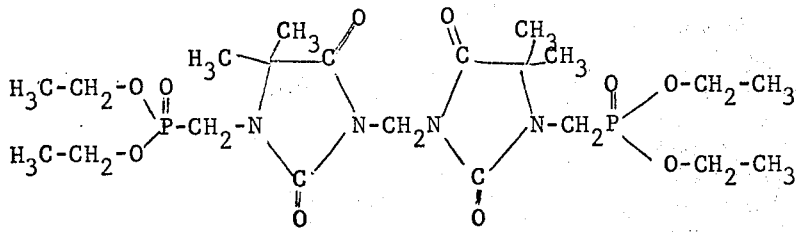

EXAMPLE 6

3,3'-Hexamethylene bis(1-diethoxyphosphonomethyl-5,5-dimethylhydantoin)

26.1 g of 1,6-bis-(1'-chloromethyl-5',5'-dimethylhydantoinyl-3')-hexane (0.06 mol) and 23.9 g of triethylphosphite (0.144 mol) are reacted, analogously to Example 1, for 6 hours at 105°–148°C. The working up takes place analogously to Example 1 and 38.0 g of a yellow, highly viscous crude product (99.3% of theory) containing 9.5% of phosphorus are obtained.

A crude product distilled in a bulb tube at 220°C/0.3 mm Hg gave a yellowish highly viscous distillate with the following elementary analysis:

| found: | required: |
|---|---|
| 48.3 % C | 48.9 % C |
| 7.65 % H | 7.58 % H |
| 8.8 % N | 8.77 % N |
| 9.5 % P | 9.70 % P |

The analysis agrees with the following structure:

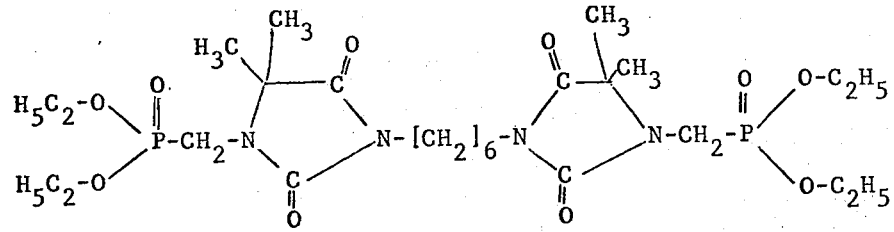

Examples of applications

EXAMPLE I

A mixture of 100 parts of the phosphonate manufactured according to Example 2, 180 parts of a triglycidyl compound from 1,3-bis-(5',5'-dimethylhydantoinyl-3')-propan-2-ol, containing 6.1 epoxide equivalents/kg, 114 parts of hexahydrophthalic anhydride and 2 parts of tetramethylammonium chloride (40% strength in methanol) is worked into a homogeneous mass at 80°C and subsequently poured into aluminium moulds prewarmed to 120°C. Curing takes place in 2 hours at 120°C and 20 hours at 150°C.

Mouldings having the following properties are obtained:

| | |
|---|---|
| Phosphrus content | : 2.8% P |
| Inflammability (CTM 20*) | : level 1/1'' |
| Heat distortion point according to Martens (DIN) | : 82°C |
| Flexural strength (VSM 77,103) | : 8.0–11.0 kp/mm² |
| Deflection (VSM 77,103) | : 3.9–5.0 mm |
| Impact strength (VSM 77,105) | : 8.5–11.0 cmkg/cm² |
| *CTM 20: Description of the test | : A horizontally | clamped DIn standard bar (120×15×10 mm) of the plastic to be tested is exposed for 1 minute to the flame of a bunsen burner fed with town gas and inclined at 45° (burner orifice: 9 mm, flame height with burner standing vertically: 10 cm), so that the 15 mm wide surface of the test specimen is 3 cm above the upper edge of the burner and the end face is at a horizontal distance of 1 cm from the bottom edge of the burner.

Level 1 denotes that after removing the flame the bar does not continue to burn for more than 15 seconds. It is comparable with Category 2 of ISO/R 1,210 (burning time 0–15 seconds).

EXAMPLE II

A mixture of 100 parts of the phosphonate manufactured according to Example 2, 180 parts of tris-epoxide from 1,3-bis-(5',5'-dimethylhydantoinyl-3')-propan-2-ol, containing 6.1 epoxide equivalents per kg, 131.8 parts of methylnadic anhydride and 2 parts of tetramethylammonium chloride (40% strength in methanol) is processed according to Example 1 and cured in 2 hours at 120°C and 20 hours at 150°C.

The cured moulding has the following properties

| | |
|---|---|
| Phosphorus content | : 2.74% |
| Inflammability (CTM 20) | : level 1/8'' |
| Heat distortion point according to Martens (DIN) | : 89°C |
| Flexural strength (VSM 77,103) | : 4.7–8.2 kp/mm² |
| Deflection (VSM 77,103) | : 3.4–7.9 mm |
| Impact strength (VSM 77,105) | : 6.0–8.0 cmkg/cm³ |

What is claimed is:

1. A dialkoxyphosphonomethyl derivative of hydantoin of the formula

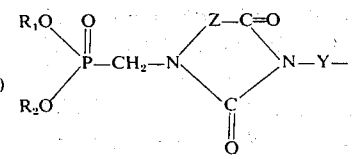

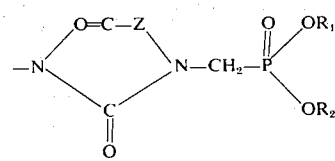

wherein

Z denotes —$CR_3R_4$— where $R_3$ and $R_4$ are alkyl of 1 to 6 carbon atoms or $R_3$ and $R_4$ together are tetramethylene or pentamethylene, Y denotes alkylene of 1 to 12 carbon atoms or 3-oxapentamethylene, and $R_1$ and $R_2$ are lower alkyl of 1 to 4 carbon atoms.

2. A compound according to claim 1 wherein Z denotes isopropylidene.

3. A compound according to claim 1 wherein Z denotes cyclohexylidene.

4. A compound according to claim 1 wherein Y denotes alkylene of 1 to 6 carbon atoms or 3-oxapentamethylene.

5. A compound according to claim 1 wherein $R_1$ and $R_2$ are methyl or ethyl.

6. A compound according to claim 4 which is 3,3'-methylenebis-(1-diethoxyphosphonomethyl-5,5-dimethylhydantoin).

7. A compound according to claim 4 which is 3,3'-hexamethylenebis-(1-diethoxyphosphonomethyl-5,5-dimethylhydantoin).

* * * * *